(12) United States Patent
Tao et al.

(10) Patent No.: US 8,374,512 B2
(45) Date of Patent: Feb. 12, 2013

(54) FREQUENCY OFFSET MONITORING DEVICE AND OPTICAL COHERENT RECEIVER

(75) Inventors: Zhenning Tao, Beijing (CN); Huijian Zhang, Beijing (CN); Takeshi Hoshida, Kanagawa (JP); Lei Li, Beijing (CN)

(73) Assignee: Fujitsu Limited, Kawasaki (JP)

( * ) Notice: Subject to any disclaimer, the term of this patent is extended or adjusted under 35 U.S.C. 154(b) by 700 days.

(21) Appl. No.: 12/219,938

(22) Filed: Jul. 30, 2008

(65) Prior Publication Data

US 2009/0080906 A1  Mar. 26, 2009

(30) Foreign Application Priority Data

Jul. 31, 2007 (CN) .......................... 2007 1 0139769

(51) Int. Cl.
*H04B 10/06* (2006.01)
*H04B 10/08* (2006.01)
(52) U.S. Cl. ......... 398/202; 398/203; 398/204; 398/205
(58) Field of Classification Search ........... 398/202–205
See application file for complete search history.

(56) References Cited

U.S. PATENT DOCUMENTS

| | | | | |
|---|---|---|---|---|
| 5,422,752 A * | 6/1995 | Hardcastle | ..................... | 398/187 |
| 5,500,878 A * | 3/1996 | Iwasaki | ........................ | 375/344 |
| 5,809,009 A * | 9/1998 | Matsuoka et al. | ............ | 370/206 |
| 6,304,620 B1 * | 10/2001 | Rouphael | ...................... | 375/344 |
| 6,456,672 B1 * | 9/2002 | Uchiki et al. | ................. | 375/344 |
| 7,636,525 B1 * | 12/2009 | Bontu et al. | .................. | 398/208 |
| 7,856,068 B1 * | 12/2010 | Tung et al. | .................... | 375/267 |
| 7,899,340 B1 * | 3/2011 | Bontu et al. | .................. | 398/209 |
| 2003/0043437 A1 * | 3/2003 | Stough et al. | ................. | 359/173 |
| 2003/0045259 A1 * | 3/2003 | Kimata | ........................ | 455/260 |
| 2004/0208643 A1 * | 10/2004 | Roberts et al. | ................ | 398/186 |
| 2006/0239370 A1 * | 10/2006 | Mody et al. | .................... | 375/260 |
| 2006/0256894 A1 * | 11/2006 | Kim | ................ | 375/326 |
| 2007/0071456 A1 * | 3/2007 | Chen et al. | .................... | 398/204 |
| 2007/0206963 A1 * | 9/2007 | Koc | ............................. | 398/202 |
| 2008/0008268 A1 * | 1/2008 | Koc | ............................. | 375/329 |
| 2008/0152361 A1 * | 6/2008 | Chen et al. | .................... | 398/205 |

FOREIGN PATENT DOCUMENTS

| JP | 5-191351 | 7/1993 |
|---|---|---|
| WO | WO 2007/021569 | 2/2007 |

OTHER PUBLICATIONS

Francis D. Natali, "AFC Tracking Algorithms", IEEE Transactions on Communications, vol. Com-32, No. 8, Aug. 1984, pp. 935-947.
Japanese Office Action issued Oct. 16, 2012 in corresponding Japanese Patent Application No. 2008-197076.

* cited by examiner

*Primary Examiner* — Nathan Curs
*Assistant Examiner* — Tanya Ngo
(74) *Attorney, Agent, or Firm* — Staas & Halsey LLP

(57) ABSTRACT

The present invention provides a frequency offset monitoring device and an optical coherent receiver. A low speed frequency offset monitoring device comprises a signal speed lowering section, for lowering the speed of an inputted signal and outputting the speed lowered signal, and a frequency offset monitor, for monitoring frequency offset of the speed lowered signal outputted by the signal speed lowering section.

3 Claims, 6 Drawing Sheets

FREQUENCY OFFSET MONITORING DEVICE AND OPTICAL COHERENT RECEIVER

TECHNICAL FIELD OF THE INVENTION

The present invention generally relates to an optical coherent receiver in an optical communication system, and more particularly to an apparatus and a method for automatic frequency control in the optical coherent receiver.

BACKGROUND OF THE INVENTION

With the increasing demand on capacity and system flexibility, optical coherent technology has again attracted more- and more attention. In comparison with incoherent technology, such as direct detection of On-Off keying (OOK), and delayed detection, namely self-coherent technology of differential phase shift keying (DPSK), the coherent technology has the following advantages: it has approximately 3 dB optical signal to noise ratio (OSNR) benefit as compared with differential detection; it can use equalization technology to countermeasure linear distortion in optical domain; and it can deal with advanced modulation schemes such as quadrature amplitude modulation (QAM).

A very important issue in a coherent receiver is how to recover the carrier phase. This can be realized by feed back control (phase locked loop), or by feed forward phase estimation. Both methods require the frequency offset between the carrier and the local oscillator to be small enough. This is usually satisfied by device specification, or by automatic frequency control (AFC). Francis D. Natali summarizes several AFC methods in "AFC tracking algorithms", IEEE transactions on communications, Vol. Com-32, No. 8 August 1984, P935. The typical analog method is differentiator AFC which requires an analog differentiator. It is common in electrical communication, but such device is very difficult for implementation in the optical communication system, since the bandwidth of an electric signal in optical communication is in the scale of ~10 GHz. The typical digital method is the cross product AFC, but it requires the digital signal processing (DSP) capability at the speed of ADC sampling rate. The sampling rate in optical communication is also in the scale of ~10 GHz, for example 40 G samples/second. Such a high speed DSP is currently very difficult.

FIG. 1 shows an optical coherent receiver that makes use of cross product automatic frequency control of the prior art. The optical coherent receiver comprises a local oscillator 103, for supplying a local oscillator optical signal; an optical hybrid 102, for mixing an optical input 101 with the local oscillator optical signal; a first twin photoelectric detector 104 and a second twin photoelectric detector 105, for converting the optical signals outputted from the optical hybrid into baseband electric signals; an automatic frequency control section, for monitoring frequency offset of the optical input 101 in accordance with the converted signal, and controlling the local oscillator 103 to output the local oscillator optical signal in accordance with the frequency offset; and a signal processing section 106, for processing the converted signal to obtain a data output. The optical coherent receiver receives an optical input, converts the optical input into a baseband electric signal including a cophase component I and a quadrature component Q, and outputs the signal to the signal processing section 106, which processes the inputted signal to obtain the data output.

The automatic frequency control section comprises a control logic 111 and a frequency offset monitor 109, of which the control logic 111 controls the frequency of the local oscillator optical signal of the local oscillator 103 in accordance with the frequency offset.

The first input terminal of the optical hybrid 102 is connected to the optical input 101, the second input terminal thereof is connected to the output terminal of the local oscillator 103, the first and second output terminals of the optical hybrid 102 are respectively connected to the first and second input terminals of the first twin photoelectric detector 104, the third and fourth output terminals thereof are respectively connected to the first and second input terminals of the second twin photoelectric detector 105, the output terminals of the first twin photoelectric detector 104 and the second twin photoelectric detector 105 are respectively connected to the first and second input terminals of the signal processing section 106, and the output terminal of the first twin photoelectric detector 104 is further connected to the first input terminal and the second input terminal of a frequency offset monitor 109, the output terminal of the second twin photoelectric detector 105 is further connected to the third input terminal and the fourth input terminal of the frequency offset monitor 109, the input terminal of the control logic 111 is connected to the output terminal 118 of the frequency offset monitor 109, and the output terminal of the control logic 111 is connected to the input terminal of the local oscillator 103.

The frequency offset monitor 109 comprises: a first delayer 114, for delaying a fourth input signal inputted via the fourth input terminal of the frequency offset monitor 109 by a predetermined time, and outputting the delayed fourth input signal; a second delayer 115, for delaying a second input signal inputted via the second input terminal of the frequency offset monitor 109 by a predetermined time, and outputting the delayed second input signal; a first multiplier 112, for calculating a product of a first input signal inputted via the first input terminal of the frequency offset monitor 109 and the delayed fourth input signal, and outputting the calculation result; a second multiplier 113, for calculating a product of a third input signal inputted via the third input terminal of the frequency offset monitor 109 and the delayed second input signal, and outputting the calculation result; a subtracter 116, for calculating a difference obtained by subtracting the calculation result of the first multiplier 112 from the calculation result of the second multiplier 113, and outputting the difference; and an averager 110, for calculating an average value of the difference outputted by the subtracter 116 as the result of frequency offset monitoring. The input terminal of the first delayer 114 is connected to the fourth input terminal of the frequency offset monitor 109, the output terminal of the first delayer 114 is connected to the second input terminal of the first multiplier 112, the input terminal of the second delayer 115 is connected to the second input terminal of the frequency offset monitor 109, the output terminal of the second delayer 115 is connected to the second input terminal of the second multiplier 113, the first input terminal of the first multiplier 112 is connected to the first input terminal of the frequency offset monitor 109, the output terminal of the first multiplier 112 is connected to the negative input terminal of the subtracter 116, the first input terminal of the second multiplier 113 is connected to the third input terminal of the frequency offset monitor 109, the output terminal of the second multiplier 113 is connected to the positive input terminal of the subtracter 116, the output terminal of the subtracter 116 is connected to the input terminal of the averager 110, and the output terminal of the averager 110 is connected to the output terminal 118 of the frequency offset monitor 109.

The aforementioned device feeds the received optical input 101 (such as s(t)exp(jωt), where s(t) is modulation baseband data signal, and ω is carrier frequency) and the local oscillator optical signal (such as $\exp(j\omega_L t)$, where $\omega_L$ is frequency of the local oscillator) of the local oscillator 103 into the optical hybrid 102. The optical hybrid 102 generates a first, a second, a third, and a fourth optical signals: S+L, S−L and S+jL, S−jL, where S is the received optical input 101, L is the local oscillator optical signal. The first twin photoelectric detector 104 and the second twin photoelectric detector 105 convert the four optical signals to two baseband electric signals. The two electric baseband signals are respectively a cophase signal I 107 and a quadrature signal Q 108, and there exists I+jQ=s(t)exp(jΔωt), where Δω=ω−$\omega_L$ is frequency offset between the local oscillator and the carrier.

The signal processing section 106 recovers data from the cophase signal I and the quadrature signal Q by performing analog or digital carrier phase recover, match filter or data recover, etc. This can be realized in the analog domain or the digital domain. The frequency offset monitor 109 is a self-correlation calculator, whose output 118 is:

$$\langle -I(t)Q(t-\tau) + Q(t)I(t-\tau)\rangle = \text{Im}(\langle s(t)\exp(j\Delta\omega t)s^*(t-\tau) \quad (1)$$
$$\exp(-j\Delta\omega t)\exp(j\Delta\omega t)\rangle)$$
$$= \text{Im}(\exp(j\Delta\omega t)\langle s(t)s^*(t-\tau)\rangle)$$
$$= \sin(\Delta\omega t)\langle s(t)s^*(t-\tau)\rangle$$

In Equation 1, τ corresponds to the delay of the delayer 114/115, "<.>" indicates averaging, and the upper mark * indicates conjugation of complex numbers. The output 118 is proportional to the frequency offset, if the self-correlation of signal s(t) is a real number. The coefficient of the proportion is not zero as long as the delay is shorter than the correlation of the modulated signal s(t). The control logic 111 and the local oscillator 103 are the same as those conventionally used in a coherent receiver.

In order to correctly realize Equation (1), the speed of the first multiplier 112, the second multiplier 113, the first delayer 114, the second delayer 115 and the subtracter 116 should match the bandwidth of s(t) in either the digital domain or the analog domain. The bandwidth of s(t) in optical communication is usually in the scale of ~10 GHz. Such ~10 GHz high speed device is difficult for the current electrical technology.

In addition, the frequency of an optical signal is usually as high as 200 THz, so that there often occurs frequency shift of several GHz. Anyway, such large frequency offset is disadvantageous to the coherent system, even in the case of using the phase locked loop.

SUMMARY OF THE INVENTION

In order to solve these problems, the present invention provides a low speed analog approach and a simplified digital approach which relax the strict hardware requirement of speed. This is very important for the high capacity optical communication system.

The present invention makes use of automatic frequency control, and provides two automatic frequency control devices in the analog domain and the digital domain.

According to the first aspect of the present invention, there is provided a low speed frequency offset monitoring device, comprising: a signal speed lowering section, for lowering the speed of an inputted signal and outputting the speed lowered signal; and a frequency offset monitor, for monitoring frequency offset of the speed lowered signal outputted by the signal speed lowering section.

The present invention provides an analog automatic frequency monitor/control which can be realized by a low speed circuit according to the first aspect of the present invention.

According to the second aspect of the present invention, there is provided the low speed frequency offset monitoring device according to the first aspect of the present invention, wherein the signal speed lowering section comprises a first low-pass filter and a second low-pass filter for low-pass filtering an inputted signal and outputting the filtered signal, and wherein the frequency offset monitor comprises: a first delayer, for delaying a fourth input signal inputted via the fourth input terminal of the frequency offset monitor by a predetermined time, and outputting the delayed fourth input signal; a second delayer, for delaying a second input signal inputted via the second input terminal of the frequency offset monitor by a predetermined time, and outputting the delayed second input signal; a first multiplier, for calculating a product of a first input signal inputted via the first input terminal of the frequency offset monitor and the delayed fourth input signal, and outputting the calculation result; a second multiplier, for calculating a product of a third input signal inputted via the third input terminal of the frequency offset monitor and the delayed second input signal, and outputting the calculation result; a subtracter, for calculating a difference obtained by subtracting the calculation result of the first multiplier from the calculation result of the second multiplier, and outputting the difference; and an averager, for calculating an average value of the difference outputted by the subtracter as the result of frequency offset monitoring.

According to the third aspect of the present invention, there is provided the low speed frequency offset monitoring device according to the second aspect of the present invention, wherein the signal speed lowering section further comprises a first and a second analog-to-digital converters, for converting the filtered signal to a digital signal, and wherein the first analog-to-digital converter is connected between the output terminal of the first low-pass filter and the first input terminal and the second input terminal of the frequency offset monitor, and the second analog-to-digital converter is connected between the output terminal of the second low-pass filter and the third input terminal and the fourth input terminal of the frequency offset monitor.

According to the fourth aspect of the present invention, there is provided the low speed frequency offset monitoring device according to the third aspect of the present invention, wherein the frequency offset monitor comprises: a first delay register, for delaying the fourth input signal inputted via the fourth input terminal of the frequency offset monitor for a predetermined time, and outputting the delayed fourth input signal; a second delay register, for delaying the second input signal inputted via the second input terminal of the frequency offset monitor for the predetermined time, and outputting the delayed second input signal; a first digital multiplier, for calculating the product of the first input signal inputted via the first input terminal of the frequency offset monitor with the delayed fourth input signal, and outputting the calculation result; a second digital multiplier, for calculating the product of the third input signal inputted via the third input terminal of the frequency offset monitor with the delayed second input signal, and outputting the calculation result; a digital subtracter, for calculating a difference value of the calculation result of the second digital multiplier subtracted from the calculation result of the first digital multiplier, and outputting the difference value; and a digital averager, for calculating an average value of the difference value outputted from the digital subtracter as the result of the frequency offset monitoring, wherein, the input terminal of the first delay register is connected to the fourth input terminal of the frequency offset monitor, the output terminal of the first delay register is connected to the second input terminal of the first digital multiplier, the input terminal of the second delay register is connected to the second input terminal of the frequency offset monitor, the output terminal of the second delay register is connected to the second input terminal of the second digital multiplier, the first input terminal of the first digital multiplier is connected to the first input terminal of the frequency offset monitor, the output terminal of the first digital multiplier is connected to the negative input terminal of the digital subtracter, the first input terminal of the second digital multiplier is connected to the third input terminal of the frequency offset monitor, the output terminal of the second digital multiplier is connected to the positive input terminal of the digital subtracter, the output terminal of the digital subtracter is connected to the input terminal of the digital averager, and the output terminal of the digital averager is connected to the output terminal of the frequency offset monitor.

According to the first to fourth aspects of the present invention, the first low-pass filter and the second low-pass filter reduce the device speed of the first multiplier, the second multiplier, the first delayer, the second delayer and the subtracter from the full band to the bandwidth of the low-pass filters. At the same time, the monitoring range is also reduced to the bandwidth of the first low-pass filter and the second low-pass filter.

The present invention further provides simplified digital frequency monitor/control operating at a speed far lower than the bit rate.

According to the fifth aspect of the present invention, there is provided the low speed frequency offset monitoring device according to the first aspect of the present invention, wherein the signal speed lowering section comprises a first and a second serial-to-parallel converters, for converting serial signals to parallel signals to lower the speed of the signals.

According to the sixth aspect of the present invention, there is provided the low speed frequency offset monitoring device according to the fifth aspect of the present invention, wherein two continuous parallel output ports of each of the first serial-to-parallel converter and the second serial-to-parallel converter are connected to the frequency offset monitor.

According to the seventh aspect of the present invention, there is provided the low speed frequency offset monitoring device according to the sixth aspect of the present invention, wherein the signal speed lowering section further comprises first to fourth digital down-sampler, for further lowering the speed of the signal, and wherein the first digital down-sampler is connected between the second parallel output port of the two continuous parallel output ports of the first serial-to-parallel converter and the first input terminal of the frequency offset monitor, the second digital down-sampler is connected between the first parallel output port of the two continuous parallel output ports of the second serial-to-parallel converter and the second input terminal of the frequency offset monitor, the third digital down-sampler is connected between the second parallel output port of the two continuous parallel output ports of the second serial-to-parallel converter and the third input terminal of the frequency offset monitor, and the fourth digital down-sampler is connected between the first parallel output port of the two continuous parallel output ports of the first serial-to-parallel converter and the fourth input terminal of the frequency offset monitor.

According to the eighth aspect of the present invention, there is provided the low speed frequency offset monitoring device according to the sixth aspect or the seventh aspect of the present invention, wherein the frequency offset monitor comprises: a first multiplier, for calculating a product of signals inputted via the first input terminal and the second input terminal of the frequency offset monitor, and outputting the calculation result; a second multiplier, for calculating a product of signals inputted via the third input terminal and the fourth input terminal of the frequency offset monitor, and outputting the calculation result; a subtracter, for calculating a difference obtained by subtracting the calculation result of the second multiplier from the calculation result of the first multiplier, and outputting the difference; and an averager, for calculating an average value of the difference outputted by the subtracter as the result of frequency offset monitoring.

According to the ninth aspect of the present invention, there is provided the low speed frequency offset monitoring device according to the fifth aspect of the present invention, wherein four continuous parallel output ports of each of the first serial-to-parallel converter and the second serial-to-parallel converter are connected to the frequency offset monitor.

According to the tenth aspect of the present invention, there is provided the low speed frequency offset monitoring device according to the first aspect of the present invention, wherein the signal speed lowering section comprises: first to sixth delay registers, for performing delayed registering on the inputted signals, and wherein the input terminal of the first delay register is connected to the first input terminal of the low speed frequency offset monitoring device, and the input terminal of the first delay register is further connected to the seventh input terminal of the frequency offset monitor, the output terminal of the first delay register is connected to the input terminal of the second delay register, and the output terminal of the first delay register is further connected to the fifth input terminal of the frequency offset monitor, the output terminal of the second delay register is connected to the input terminal of the third delay register, and the output terminal of the second delay register is further connected to the third input terminal of the frequency offset monitor, the output terminal of the third delay register is connected to the first input terminal of the frequency offset monitor, the input terminal of the fourth delay register is connected to the second input terminal of the low speed frequency offset monitoring device, and the input terminal of the fourth delay register is further connected to the eighth input terminal of the frequency offset monitor, the output terminal of the fourth delay register is connected to the input terminal of the fifth delay register, and the output terminal of the fourth delay register is further connected to the sixth input terminal of the frequency offset monitor, the output terminal of the fifth delay register is connected to the input terminal of the sixth delay register, and the output terminal of the fifth delay register is further connected to the fourth input terminal of the frequency offset monitor, and the output terminal of the sixth delay register is connected to the second input terminal of the frequency offset monitor.

According to the eleventh aspect of the present invention, there is provided the low speed frequency offset monitoring device according to the ninth aspect or the tenth aspect of the present invention, wherein the frequency offset monitor comprises: a first angle difference calculator, for calculating an angle difference between complex signals inputted via the first and the second input terminals and via the third and the fourth input terminals of the frequency offset monitor, and outputting the calculation result; a second angle difference calculator, for calculating an angle difference and self-correlation between complex signals inputted via the third and the fourth input terminals and via the fifth and the sixth input terminals of the frequency offset monitor, and outputting the calculation result; a third angle difference calculator, for calculating an angle difference between complex signals inputted via the fifth and the sixth input terminals and via the seventh and the eighth input terminals of the frequency offset monitor, and outputting the calculation result; a threshold comparator, for respectively comparing the angle differences calculated by the first angle difference calculator, the second angle difference calculator and the third angle difference calculator with a predetermined threshold value; and an averager, for calculating an average value of the self-correlation outputted by the second angle difference calculator as the result of the frequency offset monitoring.

According to the twelfth aspect of the present invention, there is provided the low speed frequency offset monitoring device according to the eleventh aspect of the present invention, wherein when the absolute values of the angle differences outputted by the first angle difference calculator, the second angle difference calculator and the third angle difference calculator are all lower than the predetermined threshold value, the threshold comparator sends an enabling signal to the averager, so that the averager reads the calculation result of the self-correlation from the second output terminal of the second angle difference calculator.

According to the thirteenth aspect of the present invention, there is provided the low speed frequency offset monitoring device according to the eleventh aspect of the present invention, wherein the first to third angle difference calculators include: a first multiplier, for calculating a product of a first input inputted via the first input terminal of the angle difference calculators and a fourth input inputted via the fourth input terminal of the angle difference calculators; a second multiplier, for calculating a product of a second input inputted via the second input terminal of the angle difference calculators and a third input inputted via the third input terminal of the angle difference calculators; a third multiplier, for calculating a product of the first input and the third input; a fourth multiplier, for calculating a product of the second input and the fourth input; an adder, for calculating a summation of the product of the first input and the third input with the product of the second input and the fourth input; a subtracter, for calculating a difference obtained by subtracting the product of the second input and the third input from the product of the first input and the fourth input; and an angle calculator, for calculating an angle difference based on the calculation results of the adder and the subtracter, and wherein, in the second angle difference calculator, the adder has a second output terminal connected to the second output terminal of the second angle difference calculator.

According to the fifth aspect to the thirteenth aspect of the present invention, since the speed of the signals converted by the first and second serial-to-parallel converters is N times lower than the full band signal s(t), demand on the electric devices used in the frequency offset monitoring is greatly reduced, thereby solving the speed problem in the prior art as discussed above.

In addition, demand on the electric devices used in the frequency offset monitoring according to the fifth aspect of the present invention can be further reduced. In the seventh aspect of the present invention, a digital down-sampler is inserted between the first and second serial-to-parallel converters and the frequency offset monitor of the low speed frequency offset monitoring device according to the present invention, so as to further reduce the demand on the operational speed of the frequency offset monitoring.

In the low speed frequency offset monitoring device according to the fifth aspect to the thirteenth aspect of the present invention, the first angle difference calculator, the second angle difference calculator and the third angle difference calculator respectively calculate the angle differences of the adjacent complex sampled signals, and output the calculation results to the threshold comparator. The threshold comparator compares the absolute values of the three angle differences with a threshold value, and determines whether the absolute values of the three angle differences are simultaneously smaller than the threshold value. If the result is true (that is to say, it can be considered that four continuous samples carry the same modulation information), the threshold comparator outputs an enabling signal to the averager to enable the averager to read in the second output of the second angle difference calculator; to the contrary, if the result is false, the threshold comparator does not output the enabling signal, so that the averager does not receive the second output of the second angle difference calculator. The advantage of this lies in the fact that: two continuous samples for generating the effective second output are caused to have the same phase modulation information, in other words, the status of the modulator is invariant between the two symbols, thereby avoiding zero offset of the detected signal caused by such undesirable factors as the transient effect.

According to the fourteenth aspect of the present invention, there is provided an automatic frequency control apparatus, comprising: the low speed frequency offset monitoring device according to the first aspect of the present invention for monitoring frequency offset of an inputted optical signal; and a control logic that outputs a control signal in accordance with the frequency offset to control the frequency offset.

According to the fifteenth aspect of the present invention, there is provided an optical coherent receiver, comprising: the automatic frequency control apparatus according to the fourteenth aspect of the present invention; a local oscillator, for supplying a local oscillator optical signal in accordance with the control signal from the automatic frequency control apparatus; an optical hybrid, for mixing an inputted optical signal with the local oscillator optical signal; first and second twin photoelectric detectors, for converting the optical signal outputted from the optical hybrid into electrical base band signals; and a signal processing device, for processing the converted signal to obtain a data output; wherein the automatic frequency control apparatus monitors the frequency offset of the inputted optical signal in accordance with the converted signal.

The local oscillator used in the optical coherent receiver according to the fifteenth aspect of the present invention is a voltage controlled oscillator (VCO) whose frequency is usually controllable by a control voltage, but such optical frequency control can also be achieved using other modes of execution.

The present invention further provides an optical coherent receiver in which the standard voltage controlled oscillator (VCO) is replaced with an optical frequency shifter.

According to the sixteenth aspect of the present invention, there is provided an optical coherent receiver, comprising: the automatic frequency control apparatus according to the fourteenth aspect of the present invention; a local oscillator, for supplying a local oscillator optical signal; a first optical frequency shifter, for shifting a frequency of the local oscillator optical signal in accordance with the first control signal from the automatic frequency control apparatus; a second optical frequency shifter, for shifting a frequency of the inputted optical signal; an optical hybrid, for mixing the inputted optical signal having been shifted frequency with the local oscillator optical signal having been shifted frequency; first and second twin photoelectric detectors, for converting the optical signal outputted from the optical hybrid into electrical base band signals; and a signal processing device, for processing the converted signal to obtain a data output; wherein the automatic frequency control apparatus monitors the frequency offset of the inputted optical signal in accordance with the converted signal.

According to the seventeenth aspect of the present invention, there is provided an optical coherent receiver, comprising: the automatic frequency control apparatus according to the fourteenth aspect of the present invention; a local oscillator, for supplying a local oscillator optical signal; an optical frequency shifter, for shifting a frequency of the local oscillator optical signal in accordance with the control signal from the automatic frequency control apparatus; an optical hybrid, for mixing the inputted optical signal with the local oscillator optical signal having been shifted frequency; first and second twin photoelectric detectors, for converting the optical signal outputted from the optical hybrid into electrical base band signals; and a signal processing device, for processing the converted signal to obtain a data output; wherein the automatic frequency control apparatus monitors the frequency offset of the inputted optical signal in accordance with the converted signal.

According to the eighteenth aspect of the present invention, there is provided an optical coherent receiver, comprising: the automatic frequency control apparatus according to the fourteenth aspect of the present invention; a local oscillator, for supplying a local oscillator optical signal; an optical frequency shifter, for shifting a frequency of the inputted optical signal in accordance with the control signal from the automatic frequency control apparatus; an optical hybrid, for mixing the inputted optical signal having been shifted frequency with the local oscillator optical signal; first and second twin photoelectric detectors, for converting the optical signal outputted from the optical hybrid into electrical base band signals; and a signal processing device, for processing the converted signal to obtain a data output; wherein the automatic frequency control apparatus monitors the frequency offset of the inputted optical signal in accordance with the converted signal.

According to the nineteenth aspect of the present invention, there is provided the optical coherent receiver according to any of the fifteenth to eighteenth aspects of the present invention, further comprising: first and second analog-to-digital converters, for respectively converting the base band electrical signals outputted from the first and the second twin photoelectric detectors into digital signals; wherein the first and second analog-to-digital converters are respectively connected between the first and second twin photoelectric detectors and the automatic frequency control apparatus.

According to the twentieth aspect of the present invention, there is further provided a low speed frequency offset monitoring method, comprising: lowering the speed of an inputted signal and outputting the speed lowered signal; and monitoring frequency offset of the speed lowered signal.

BRIEF DESCRIPTION OF THE DRAWINGS

The included drawings provide further comprehension of the present invention, and are incorporated into the Description and constitute a part of the Description. The accompanying drawings illustrate the embodiments of the present invention, and explain the principles of the present invention together with the Description. In the drawings.

DETAILED DESCRIPTION OF THE EMBODIMENTS

The main purpose of the present invention is to overcome the speed problem in the aforementioned prior art. Embodiments of the present invention will be described in detail below with reference to the accompanying drawings.

Figure 2:
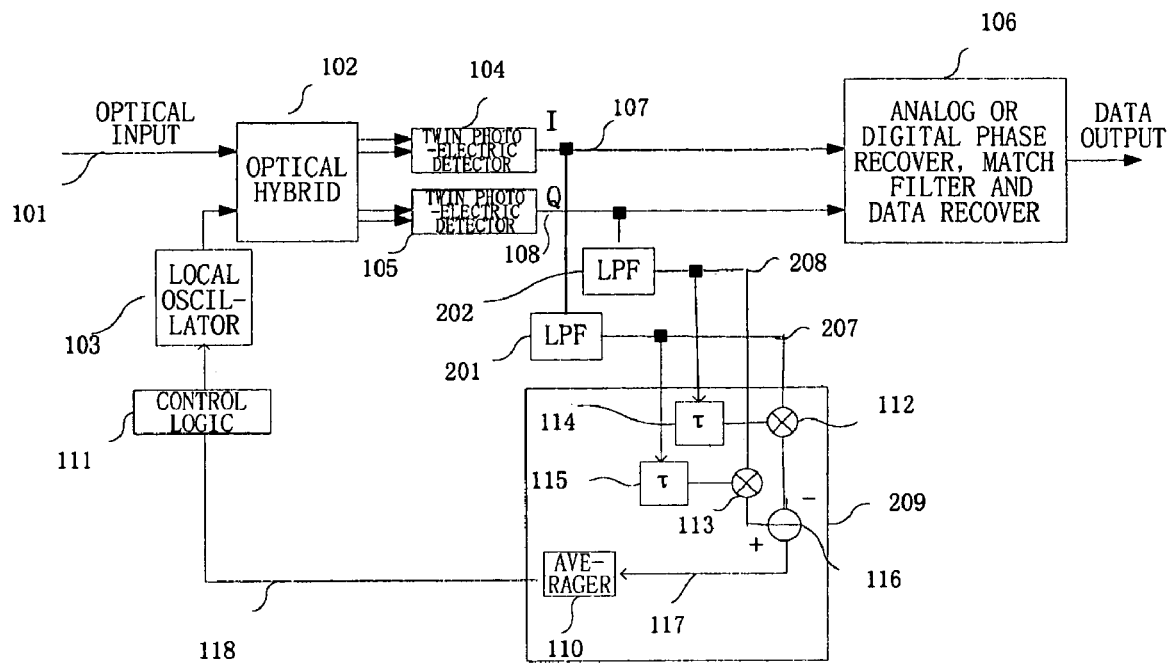
FIG. 2 shows an optical coherent receiver with analog cross product automatic frequency control according to the present invention achievable by a low speed circuit.

FIG. 2 shows an optical coherent receiver with analog cross product automatic frequency control according to the present invention achievable by a low speed circuit.

Figure 1:
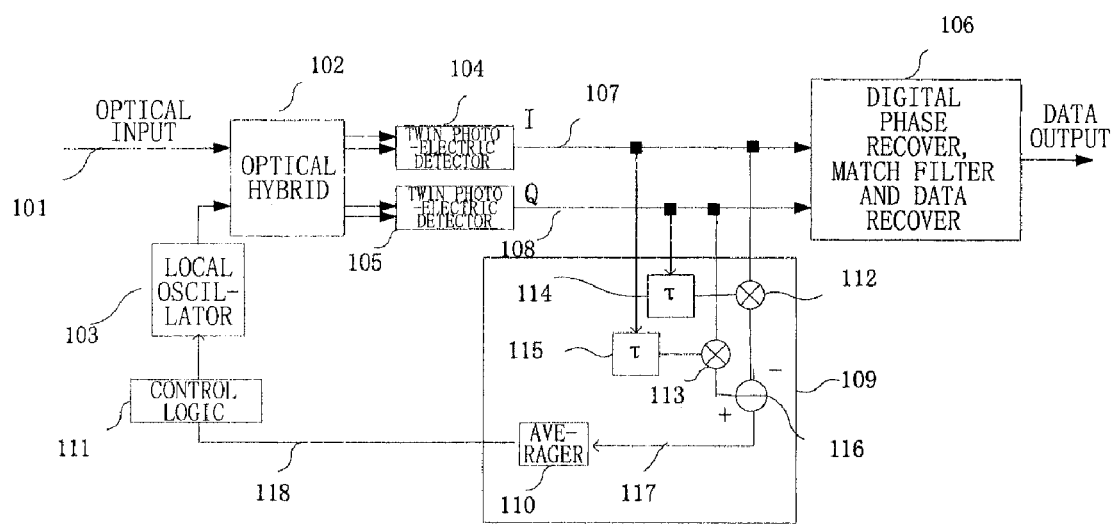
FIG. 1 shows an optical coherent receiver that makes use of cross product automatic frequency control of the prior art.

The optical coherent receiver as shown in FIG. 2 is similar in structure to that shown in FIG. 1, and the same reference numerals used in FIG. 1 are used in FIG. 2 to indicate identical or similar component parts. Besides the component parts of the structure shown in FIG. 1, in FIG. 2, there are added two low-pass filters (LPF), namely a first low-pass filter 201 and a second low pass filter 202, and the frequency offset monitor 209 calculates the self-correlation of low pass filtered signals 207 and 208, instead of the full band signals (namely the cophase signal I 107 and the quadrature signal Q 108).

Similar to the prior art structure as shown in FIG. 1, the optical coherent receiver as shown in FIG. 2 comprises: a local oscillator 103, for supplying a local oscillator optical signal; an optical hybrid 102, for mixing an optical input 101 with the local oscillator optical signal; a first twin photoelectric detector 104 and a second twin photoelectric detector 105, for converting the optical signals outputted from the optical hybrid into baseband electric signals; an automatic frequency control section, for monitoring frequency offset of the optical input 101 in accordance with the converted signal, and controlling the local oscillator 103 to output the local oscillator optical signal in accordance with the frequency offset; and a signal processing section 106, for processing the converted signal to obtain a data output. The optical coherent receiver receives an optical input, converts the optical input into two baseband electric signals, and outputs the two baseband electric signals to the signal processing section 106, which processes the inputted signals to obtain the data output by performing analog or digital carrier phase recover, match filter or data recover, etc.

The automatic frequency control section comprises a control logic 111 and a low speed analog frequency offset monitoring section, of which the control logic 111 controls the frequency of the local oscillator optical signal of the local oscillator 103 in accordance with the frequency offset.

The first input terminal of the optical hybrid 102 is connected to the optical input 101, the second input terminal thereof is connected to the output terminal of the local oscillator 103, the first and second output terminals of the optical hybrid 102 are respectively connected to the first and second input terminals of the first twin photoelectric detector 104, the third and fourth output terminals thereof are respectively connected to the first and second input terminals of the second twin photoelectric detector 105, the output terminals 107 and 108 of the first twin photoelectric detector 104 and the second twin photoelectric detector 105 are respectively connected to the first and second input terminals of the signal processing section 106, and the output terminal of the first twin photoelectric detector 104 is further connected to the first input terminal of the low speed analog frequency offset monitoring section, the output terminal of the second twin photoelectric detector 105 is further connected to the second input terminal of the low speed analog frequency offset monitoring section, the input terminal of the control logic 111 is connected to the output terminal of the low speed analog frequency offset monitoring section, and the output terminal of the control logic 111 is connected to the input terminal of the local oscillator 103.

The low speed analog frequency offset monitoring section comprises: a first low-pass filter 201 and a second low-pass filter 202, for respectively low pass filtering the outputs of the first twin photoelectric detector 104 and the second twin photoelectric detector 105; and a frequency offset monitor 209, for monitoring frequency offset in accordance with the filtered signals outputted from the first low-pass filter 201 and the second low-pass filter 202. The input terminal of the first low-pass filter 201 is connected to the first input terminal of the low speed analog frequency offset monitoring section, the output terminal of the first low-pass filter 201 is connected to the first input terminal and the second input terminal of the frequency offset monitor 209, the input terminal of the second low-pass filter 202 is connected to the second input terminal of the low speed analog frequency offset monitoring section, the output terminal of the second low-pass filter 202 is connected to the third input terminal and the fourth input terminal of the frequency offset monitor 209, and the output terminal 118 of the frequency offset monitor 209 is connected to the output terminal of the low speed analog frequency offset monitoring section.

The structure of the frequency offset monitor 209 is essentially the same as the structure of the frequency offset monitor 109 shown in FIG. 1. As shown in FIG. 2, the frequency offset monitor 209 comprises: a first delayer 114, for delaying a fourth input signal inputted via the fourth input terminal of the frequency offset monitor 209 by a predetermined time, and outputting the delayed fourth input signal; a second delayer 115, for delaying a second input signal inputted via the second input terminal of the frequency offset monitor 209 by a predetermined time, and outputting the delayed second input signal; a first multiplier 112, for calculating a product of a first input signal inputted via the first input terminal of the frequency offset monitor 209 and the delayed fourth input signal, and outputting the calculation result; a second multiplier 113, for calculating a product of a third input signal inputted via the third input terminal of the frequency offset monitor 209 and the delayed second input signal, and outputting the calculation result; a subtracter 116, for calculating a difference obtained by subtracting the calculation result of the first multiplier 112 from the calculation result of the second multiplier 113, and outputting the difference; and an averager 110, for calculating an average value of the difference outputted by the subtracter 116 as the result of frequency offset monitoring. The input terminal of the first delayer 114 is connected to the fourth input terminal of the frequency offset monitor 209, the output terminal of the first delayer 114 is connected to the second input terminal of the first multiplier 112, the input terminal of the second delayer 115 is connected to the second input terminal of the frequency offset monitor 209, the output terminal of the second delayer 115 is connected to the second input terminal of the second multiplier 113, the first input terminal of the first multiplier 112 is connected to the first input terminal of the frequency offset monitor 209, the output terminal of the first multiplier 112 is connected to the negative input terminal of the subtracter 116, the first input terminal of the second multiplier 113 is connected to the third input terminal of the frequency offset monitor 209, the output terminal of the second multiplier 113 is connected to the positive input terminal of the subtracter 116, the output terminal of the subtracter 116 is connected to the input terminal of the averager 110, and the output terminal of the averager 110 is connected to the output terminal 118 of the frequency offset monitor 209.

Suppose the pulse response of the first low-pass filter 201 and the second low-pass filter 202 is h(t), the filtered complex signal is the convolution of the inputted signals 107/108 and the pulse response h(t), which can be expressed as:

$$s(t)\exp(j\Delta\omega t) \otimes h(t) = \int s(t-u)\exp(j\Delta\omega t)\exp(-j\Delta\omega u)h(u)du$$

$$= \exp(j\Delta\omega t)\int s(t-u)\exp(-j\Delta\omega u)h(u)du$$

where u is an integration variable.

When $\Delta\omega u \ll 1$, $$s(t)\exp(j\Delta\omega t) \otimes h(t) \approx \exp(j\Delta\omega t)\int s(t-u)h(u)du$$

$$= \exp(j\Delta\omega t)s(t) \otimes h(t)$$

$$= \exp(j\Delta\omega t)s'(t)$$

The output of the frequency offset monitor 209 can be obtained according to Equation (1) as:

$$\sin(\Delta\omega\tau)\langle s'(t)s''(t-\tau)\rangle.$$

The output is proportional to the frequency offset as long as the delay τ is shorter than the correlation time of s'(t) (this is mainly determined by the bandwidth of the first low-pass filter 201 and the second low-pass filter 202). The first low-pass filter 201 and the second low-pass filter 202 reduce the device speed of the first multiplier 112, the second multiplier 113, the first delayer 114, the second delayer 115 and the subtracter 116 from the full band to the bandwidth of the low-pass filters. However, the monitoring range is also reduced to the bandwidth of the first low-pass filter 201 and the second low-pass filter 202, because $\Delta\omega u \ll 1$ requires the frequency offset to be less than the bandwidth of the first low-pass filter 201 and the second low-pass filter 202.

Figure 3:
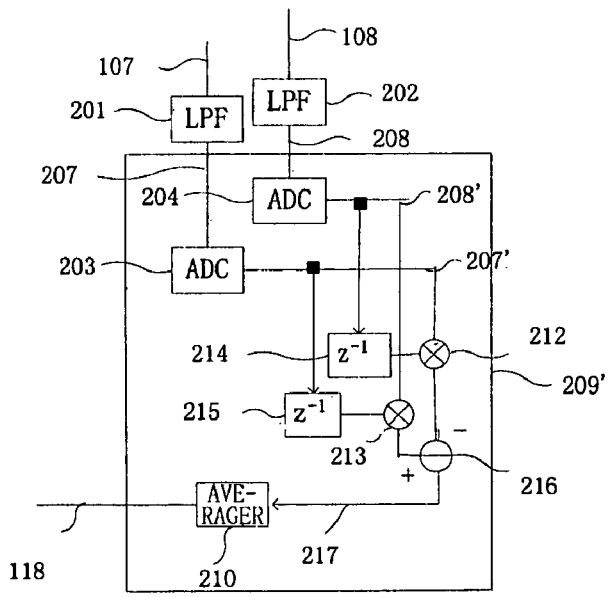
FIG. 3 shows another mode of execution of the cross product automatic frequency control which combines analog technology with digital technology.

As shown in FIG. 2, the first multiplier 112, the second multiplier 113, the first delayer 114, the second delayer 115 and the subtracter 116 of the frequency offset monitor 209 are all analog, but they can also be realized in the digital domain. FIG. 3 shows another mode of execution of the cross product automatic frequency control which combines analog technology with digital technology.

As shown in FIG. 3, the low speed analog-digital mixed frequency offset monitoring section comprises: a first low-pass filter 201 and a second low-pass filter 202, for low pass filtering the output of the optical frequency control section; a first analog-to-digital converter 203 and a second analog-to-digital converter 204, for converting the analog signal outputted from the first low-pass filter 201 and the second low-pass filter 202 into a digital signal; and a frequency offset monitor 209'. The input terminal of the first low-pass filter 201 is connected to the first input terminal of the low speed analog-digital mixed frequency offset monitoring section, the output terminal 207 of the first low-pass filter 201 is connected to the input terminal of the first analog-to-digital converter 203, the input terminal of the second low-pass filter 202 is connected to the second input terminal of the low speed analog-digital mixed frequency offset monitoring section, the output terminal 208 of the second low-pass filter 202 is connected to the input terminal of the second analog-to-digital converter 204, the output terminal 207' of the first analog-to-digital converter 203 is connected to the first and the second input terminals of the frequency offset monitor 209', the output terminal 208' of the second analog-to-digital converter 204 is connected to the third and fourth input terminals of the frequency offset monitor 209', and the output terminal 118 of the frequency offset monitor 209' is connected to the output terminal of the low speed analog-digital mixed frequency offset monitoring section.

The frequency offset monitor 209' comprises: a first delay register 214, for delaying the fourth input signal inputted via the fourth input terminal of the frequency offset monitor 209' for one sample, and outputting the delayed fourth input signal; a second delay register 215, for delaying the second input signal inputted via the second input terminal of the frequency offset monitor 209' for one sample, and outputting the delayed second input signal; a first digital multiplier 212, for calculating the product of the first input signal inputted via the first input terminal of the frequency offset monitor 209' with the delayed fourth input signal, and outputting the calculation result; a second digital multiplier 213, for calculating the product of the third input signal inputted via the third input terminal of the frequency offset monitor 209' with the delayed second input signal, and outputting the calculation result; a digital subtracter 216, for calculating a difference value obtained by subtracting the calculation result of the first digital multiplier 212 from the calculation result of the second digital multiplier 213, and outputting the difference value; and a digital averager 210, for calculating an average value of the difference value outputted from the digital subtracter 216 as the result of the frequency offset monitoring.

The input terminal of the first delay register 214 is connected to the fourth input terminal of the frequency offset monitor 209', the output terminal of the first delay register 214 is connected to the second input terminal of the first digital multiplier 212, the input terminal of the second delay register 215 is connected to the second input terminal of the frequency offset monitor 209', the output terminal of the second delay register 215 is connected to the second input terminal of the second digital multiplier 213, the first input terminal of the first digital multiplier 212 is connected to the first input terminal of the frequency offset monitor 209', the output terminal of the first digital multiplier 212 is connected to the negative input terminal of the digital subtracter 216, the first input terminal of the second digital multiplier 213 is connected to the third input terminal of the frequency offset monitor 209', the output terminal of the second digital multiplier 213 is connected to the positive input terminal of the digital subtracter 216, the output terminal of the digital subtracter 216 is connected to the input terminal of the digital averager 210, and the output terminal of the digital averager 210 is connected to the output terminal 118 of the frequency offset monitor 209'.

The optical coherent receivers as shown in FIGS. 2 and 3 are based on analog cross product automatic frequency control, but digital signal processing (DSP) can also be used to achieve digital cross product automatic frequency control.

Figure 4:
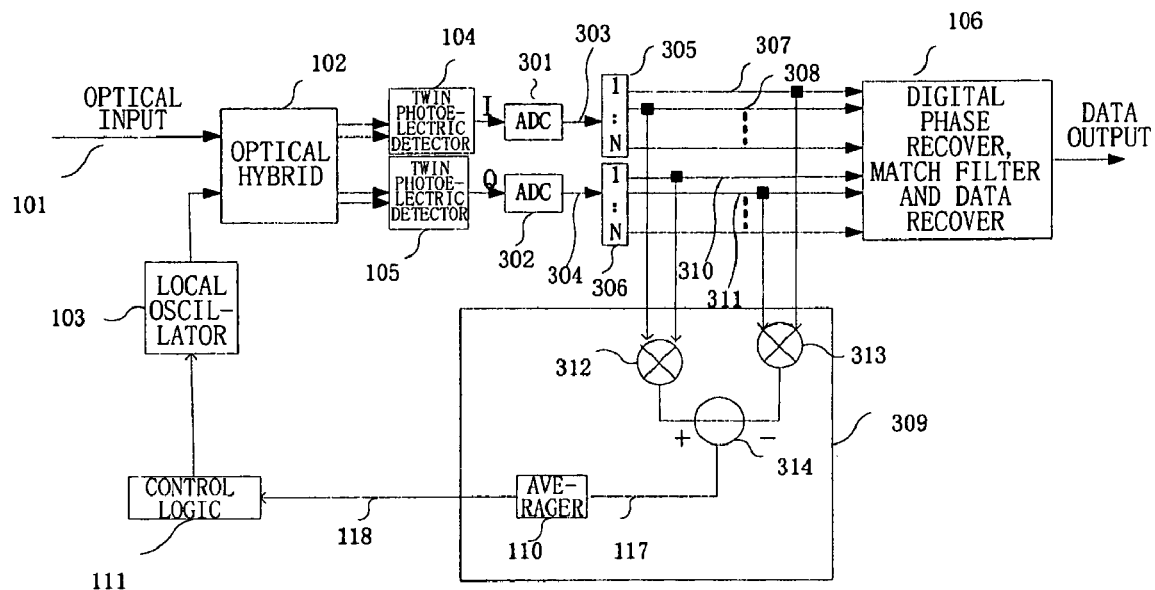
FIG. 4 shows an optical coherent receiver with digital cross product automatic frequency control according to the present invention achievable by DSP with speed far lower than that of the prior art.

FIG. 4 shows an embodiment of the optical coherent receiver with digital cross product automatic frequency control according to the present invention achievable by low speed DSP.

The structure of the optical coherent receiver as shown in FIG. 4 is similar to the structure of the optical coherent receiver as shown in FIG. 2, but is added with two analog-to-digital converters (ADC) 301 and 302 for converting analog signals into the digital domain, as well as two 1:N serial-to-parallel converters 305 and 306 for lowering the speed of the signal by N times.

Similar to the structure shown in FIG. 2, the optical coherent receiver shown in FIG. 4 comprises: a local oscillator 103, for supplying a local oscillator optical signal; an optical hybrid 102, for mixing an optical input 101 with the local oscillator optical signal; a first twin photoelectric detector 104 and a second twin photoelectric detector 105, for converting the optical signals outputted from the optical hybrid into baseband electric signals; a first analog-to-digital converter 301 and a second analog-to-digital converter 302, for converting the baseband electric signals to digital signals; an automatic frequency control section, for monitoring frequency offset of the optical input 101 in accordance with the digital signals, and controlling the local oscillator 103 to output the local oscillator optical signal in accordance with the frequency offset; and a digital signal processing section 106, for processing the signals to obtain a data output. The optical coherent receiver receives an optical input, converts the optical input into a digital signal, and outputs the digital signal to the digital signal processing section 106, which processes the inputted signal to obtain the data output by performing digital carrier phase recover, match filter or data recover, etc.

The automatic frequency control section comprises a control logic 111 and a low speed digital frequency offset monitoring section, of which the control logic 111 controls the frequency of the local oscillator optical signal of the local oscillator 103 in accordance with the frequency offset.

The first input terminal of the optical hybrid 102 is connected to the optical input 101, the second input terminal thereof is connected to the output terminal of the local oscillator 103, the first and second output terminals of the optical hybrid 102 are respectively connected to the first and second input terminals of the first twin photoelectric detector 104, the third and fourth output terminals thereof are respectively connected to the first and second input terminals of the second twin photoelectric detector 105, the output terminal I of the first twin photoelectric detector 104 is connected to the input terminal of the first analog-to-digital converter 301, the output terminal Q of the second twin photoelectric detector 105 is connected to the input terminal of the second analog-to-digital converter 302, the output terminal 303 of the first analog-to-digital converter 301 is connected to the first input terminal of the low speed digital frequency offset monitoring section, the output terminal 304 of the second twin photoelectric detector 105 is connected to the second input terminal of the low speed digital frequency offset monitoring section, the input terminal of the control logic 111 is connected to the output terminal of the low speed digital frequency offset monitoring section, and the output terminal of the control logic 111 is connected to the input terminal of the local oscillator 103.

The low speed digital frequency offset monitoring section comprises: a first 1:N serial-to-parallel converter 305 and a second 1:N serial-to-parallel converter 306, for lowering the speed of the signal by N times; and a frequency offset monitor 309. The first 1:N serial-to-parallel converter 305 and the second 1:N serial-to-parallel converter 306 form the sampling sections of the monitored signal. The input terminal of the first 1:N serial-to-parallel converter 305 is connected to the first input terminal of the low speed digital frequency offset monitoring section, the input terminal of the second 1:N serial-to-parallel converter 306 is connected to the second input terminal of the low speed digital frequency offset monitoring section, the parallel output ports of the first 1:N serial-to-parallel converter 305 and the second 1:N serial-to-parallel converter 306 are connected to the input terminal of the digital signal processing section 106, the second parallel output port 308 of the first 1:N serial-to-parallel converter 305 is connected to the first input terminal of the frequency offset monitor 309, the first parallel output port 307 of the first 1:N serial-to-parallel converter 305 is connected to the fourth input terminal of the frequency offset monitor 309, the first parallel output port 310 of the second 1:N serial-to-parallel converter 306 is connected to the second input terminal of the frequency offset monitor 309, the second parallel output port 311 of the second 1:N serial-to-parallel converter 306 is connected to the third input terminal of the frequency offset monitor 309, and the output terminal 118 of the frequency offset monitor 309 is connected to the output terminal of the low speed digital frequency offset monitoring section.

The frequency offset monitor 309 comprises: a first multiplier 312, for calculating a product of the signals inputted via the first input terminal and the second input terminal of the frequency offset monitor 309, and outputting the calculation result; a second multiplier 313, for calculating a product of the signals inputted via the third input terminal and the fourth input terminal of the frequency offset monitor 309, and outputting the calculation result; a subtracter 314, for calculating a difference obtained by subtracting the calculation result of the first multiplier 312 from the calculation result of the second multiplier 313, and outputting the difference; and an averager 110, for calculating an average value of the difference outputted by the subtracter 314 as the result of frequency offset monitoring. The first input terminal of the first multiplier 312 is connected to the first input terminal of the frequency offset monitor 309, the second input terminal of the first multiplier 312 is connected to the second input terminal of the frequency offset monitor 309, the output terminal of the first multiplier 312 is connected to the positive input terminal of the subtracter 314, the first input terminal of the second multiplier 313 is connected to the third input terminal of the frequency offset monitor 309, the second input terminal of the second multiplier 313 is connected to the fourth input terminal of the frequency offset monitor 309, the output terminal of the second multiplier 313 is connected to the negative input terminal of the subtracter 314, the output terminal 317 of the subtracter 314 is connected to the input terminal of the averager 110, and the output terminal of the averager 110 is connected to the output terminal 118 of the frequency offset monitor 309.

The first and second 1:N serial-to-parallel converters 305 and 306 are mainly determined by design optimization of the digital signal processing section 106 and/or physical electric connection between the first and second 1:N serial-to-parallel converters 305 and 306 and the digital signal processing section 106, instead of by design optimization of the frequency offset monitor 309.

Although the first twin photoelectric detector 104 and the second twin photoelectric detector 105 are shown in FIG. 4 as directly connected to the first analog-to-digital converter 301 and the second analog-to-digital converter 302, and the first analog-to-digital converter 301 and the second analog-to-digital converter 302 are shown as directly connected to the first and second 1:N serial-to-parallel converters 305 and 306, a match filter can also be inserted between them.

In the optical coherent receiver as shown in FIG. 4, the digital sampled signal I 303 and digital sampled signal Q 304 are:

$$I+jQ = s_n \exp(j\Delta\omega n\tau) = s(t)\exp(j\Delta\omega t)|_{t=mN\tau}$$

where n is sampling index, and $\tau$ is sampling period.

After being converted by the first and second 1:N serial-to-parallel converters 305 and 306, the down sampled signal (307)+j(310) is:

$$s_{mN}\exp(j\Delta\omega mN\tau) = s(t)\exp(j\Delta\omega t)|_{t=mN\tau}$$

and the down sampled signal (308)+j(311) is:

$$s_{mN-1}\exp(j\Delta\omega mN\tau)\exp(-j\Delta\omega\tau) = s(t)\exp(j\Delta\omega t)|_{t=mN\tau-\tau'}$$

Therefore, the output 118 of the frequency offset monitor 309 is:

$$\langle (308)*(310) - (307)*(311) \rangle = \langle \text{Im}[((307) + j(310)) *$$
$$((308) - j(311))] \rangle$$
$$= \langle \text{Im}[s_{mN}\exp(j\Delta\omega mN\tau)s^*_{mN-1}$$
$$\exp(-j\Delta\omega mN\tau)\exp(j\Delta\omega t)] \rangle$$
$$= \text{Im}(\exp(j\Delta\omega t)\langle s_{mN}s^*_{mN-1}\rangle)$$
$$= \sin(\Delta\omega t)\langle s_{mN}s^*_{mN-1}\rangle$$

The output is still proportional to the frequency offset. Since the speed of the signals 307, 308, 310 and 311 is N times lower than the full band signal s(t), demand on the electrical devices in the frequency offset monitor 309 is greatly reduced, thereby solving the speed problem of the aforementioned prior art.

Although the parallel output ports 307, 308 and the parallel output ports 310, 311 are shown in FIG. 4 as respectively being the first and second parallel output ports of the first and second 1:N serial-to-parallel converters 305 and 306, they can also be any random two continuous parallel output ports.

In addition, demand on the electrical devices in the frequency offset monitor can be further reduced in the automatic frequency control shown in FIG. 4.

Figure 5:
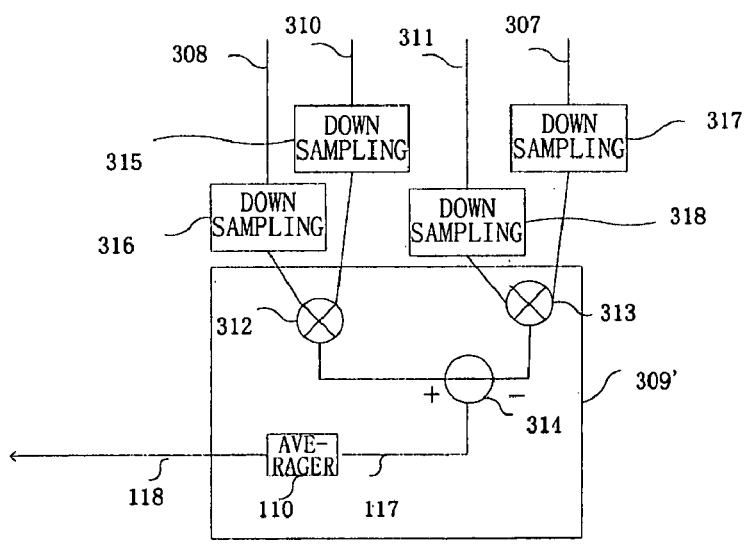
FIG. 5 shows another mode of execution of FIG. 4 with further lowered processing speed.

As shown in FIG. 5, it is possible to respectively insert digital down-samplers 315-318 to the input terminals of the first multiplier 312 and the second multiplier 313, so as to further reduce demand on the operational speed of the frequency offset monitor 309'.

In the embodiment as shown in FIG. 4, two continuous complex sampled signals are used to calculate the self-correlation of the signals to thereby monitor the frequency offset, but this method cannot effectively countermeasure zero offset of the detected signal caused by undesirable factors in phase modulation.

Figure 6:
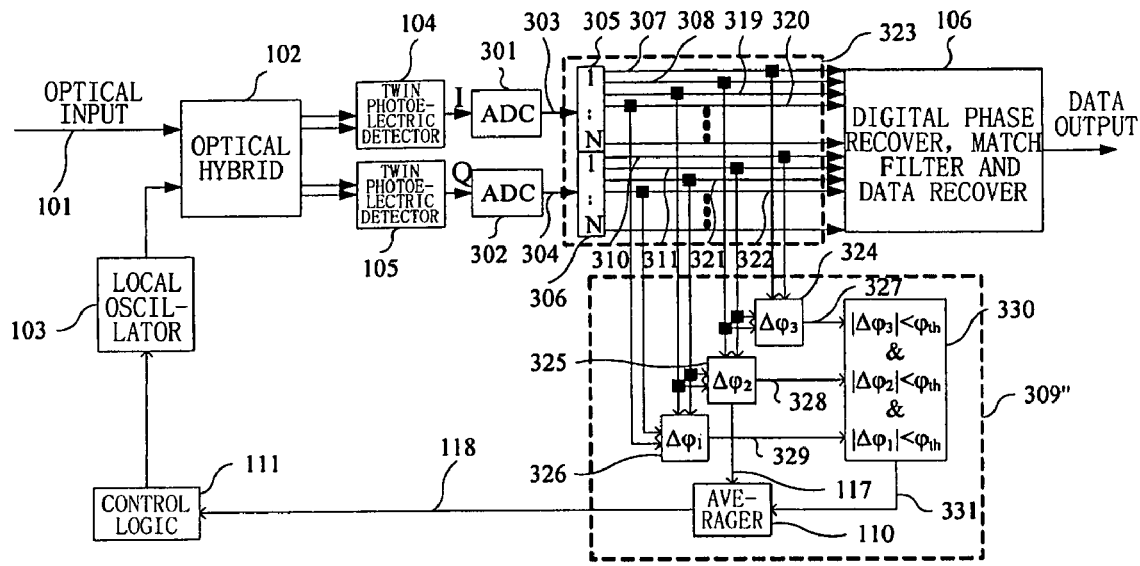
FIG. 6 shows a frequency offset monitor having sampled signal selection function.

FIG. 6 shows a variation of the embodiment as shown in FIG. 4. This variation has sampled signal selection function to countermeasure certain undesirable factors in phase modulation, such as chirp introduced by the transient effect.

In comparison with the structure of the embodiment as shown in FIG. 4, the structure of the variation as shown in FIG. 6 differs in the fact that the frequency offset monitor 309" is more complicated in structure, as the input of the frequency offset monitor 309" is increased from the two continuous complex sampled signals ((307)+j(310) and (308)+j(311)) in the embodiment of FIG. 4 to four continuous complex sampled signals ((307)+j(310), (308)+j(311), (319)+j(321), and (320)+j(322)).

The following description is made only to the low speed digital frequency offset monitoring section in FIG. 6 that differs from that in FIG. 4, while description is omitted for the remaining portions of the optical coherent receiver in FIG. 6 as identical with those in FIG. 4.

The low speed digital frequency offset monitoring section of the optical coherent receiver as shown in FIG. 6 comprises: a first 1:N serial-to-parallel converter 305 and a second 1.:N serial-to-parallel converter 306, for lowering the speed of the signal by N times; and a frequency offset monitor 309". The first 1:N serial-to-parallel converter 305 and the second 1:N serial-to-parallel converter 306 form the sampling sections 323 of the monitored signal. The input terminal of the first 1:N serial-to-parallel converter 305 is connected to the first input terminal of the low speed digital frequency offset monitoring section, the input terminal of the second 1:N serial-to-parallel converter 306 is connected to the second input terminal of the low speed digital frequency offset monitoring section, the parallel output ports of the first 1:N serial-to-parallel converter 305 and the second 1:N serial-to-parallel converter 306 are connected to the input terminal of the digital signal processing section 106, the fourth parallel output port 320 of the first 1:N serial-to-parallel converter 305 is connected to the first input terminal of the frequency offset monitor 309", the third parallel output port 319 of the first 1:N serial-to-parallel converter 305 is connected to the third input terminal of the frequency offset monitor 309", the second parallel output port 308 of the first 1:N serial-to-parallel converter 305 is connected to the fifth input terminal of the frequency offset monitor 309", the first parallel output port 307 of the first 1:N serial-to-parallel converter 305 is connected to the seventh input terminal of the frequency offset monitor 309", the fourth parallel output port 322 of the second 1:N serial-to-parallel converter 306 is connected to the second input terminal of the frequency offset monitor 309", the third parallel output port 321 of the second 1:N serial-to-parallel converter 306 is connected to the fourth input terminal of the frequency offset monitor 309", the second parallel output port 311 of the second 1:N serial-to-parallel converter 306 is connected to the sixth input terminal of the frequency offset monitor 309", the first parallel output port 310 of the second 1:N serial-to-parallel converter 306 is connected to the eighth input terminal of the frequency offset monitor 309", and the output terminal 118 of the frequency offset monitor 309" is connected to the output terminal of the low speed digital frequency offset monitoring section.

The frequency offset monitor 309" comprises: a first angle difference calculator 326, for calculating an angle difference between complex signals inputted via the first and the second input terminals and via the third and the fourth input terminals of the frequency offset monitor 309", and outputting the calculation result; a second angle difference calculator 325, for calculating an angle difference and self-correlation between complex signals inputted via the third and the fourth input terminals and via the fifth and the sixth input terminals of the frequency offset monitor 309", and outputting the calculation result; a third angle difference calculator 324, for calculating an angle difference between complex signals inputted via the fifth and the sixth input terminals and via the seventh and the eighth input terminals of the frequency offset monitor 309", and outputting the calculation result; a threshold comparator 330, for respectively comparing the angle differences calculated by the first angle difference calculator 326, the second angle difference calculator 325 and the third angle difference calculator 324 with a predetermined threshold value; and an averager 110, for calculating an average value of the self-correlation outputted by the second angle difference calculator 325 as the result of the frequency offset monitoring.

The first and second input terminals of the first angle difference calculator 326 are respectively connected to the fourth parallel output port 320 of the first 1:N serial-to-parallel converter 305 and the fourth parallel output port 322 of the second 1:N serial-to-parallel converter 306, the third and fourth input terminals of the first angle difference calculator 326 are respectively connected to the third parallel output port 319 of the first 1:N serial-to-parallel converter 305 and the third parallel output port 321 of the second 1:N serial-to-parallel converter 306, the output terminal 329 of the first angle difference calculator 326 is connected to the first input terminal of the threshold comparator 330, the first and second input terminals of the second angle difference calculator 325 are respectively connected to the third parallel output port 319 of the first 1:N serial-to-parallel converter 305 and the third parallel output port 321 of the second 1:N serial-to-parallel converter 306, the third and fourth input terminals of the second angle difference calculator 325 are respectively connected to the second parallel output port 308 of the first 1:N serial-to-parallel converter 305 and the second parallel output port 311 of the second 1:N serial-to-parallel converter 306, the first output terminal 328 of the second angle difference calculator 325 is connected to the second input terminal of the threshold comparator 330, and the second output terminal 117 of the second angle difference calculator 325 is connected to the first input terminal of the averager 110; the first and second input terminals of the third angle difference calculator 324 are respectively connected to the second parallel output port 308 of the first 1:N serial-to-parallel converter 305 and the second parallel output port 311 of the second 1:N serial-to-parallel converter 306, the third and fourth input terminals of the third angle difference calculator 324 are respectively connected to the first parallel output port 307 of the first 1:N serial-to-parallel converter 305 and the first parallel output port 310 of the second 1:N serial-to-parallel converter 306, the output terminal 327 of the third angle difference calculator 324 is connected to the third input terminal of the threshold comparator 330, the output terminal 331 of the threshold comparator 330 is connected to the second input terminal of the averager 110, and the output terminal of the averager 110 is connected to the output terminal 118 of the frequency offset monitor 309".

The first angle difference calculator 326, the second angle difference calculator 325 and the third angle difference calculator 324 respectively calculate the angle differences of the adjacent complex sampled signals, and output the calculation results 329, 328 and 327 to the threshold comparator 330. The threshold comparator 330 compares the absolute values of the three angle differences with a threshold value $\Phi_{th}$, and determines whether the absolute values of the three angle differences are simultaneously smaller than the threshold value. If the result is true (that is to say, it can be considered that four continuous samples carry the same modulation information), the threshold comparator 330 outputs an enabling signal 331 to the averager 110 to enable the averager 110 to read in the second output 117 of the second angle difference calculator 325; to the contrary, if the result is false, the threshold comparator 330 does not output the enabling signal, so that the averager 110 does not receive the second output 117 of the second angle difference calculator 325. The advantage of this lies in the fact that: two continuous samples for generating the effective output 117 are caused to have the same phase modulation information, in other words, the status of the modulator is invariant between the two symbols, thereby avoiding zero offset of the detected signal caused by such undesirable factors as the transient effect.

In the structure as shown in FIG. 6, the four continuous samples are obtained from the first four parallel output ports, but the present invention is not restricted thereto, as it is possible to obtain the four continuous samples from any random four continuous parallel output ports.

Except that the second angle difference calculator 325 further comprises the second output 117, the first angle difference calculator 326, the second angle difference calculator 325 and the third angle difference calculator 324 are complete identical in structure.

The internal structures of these angle difference calculators are described below with reference to FIG. 7 and taking the second angle difference calculator 325 as an example.

Figure 7:
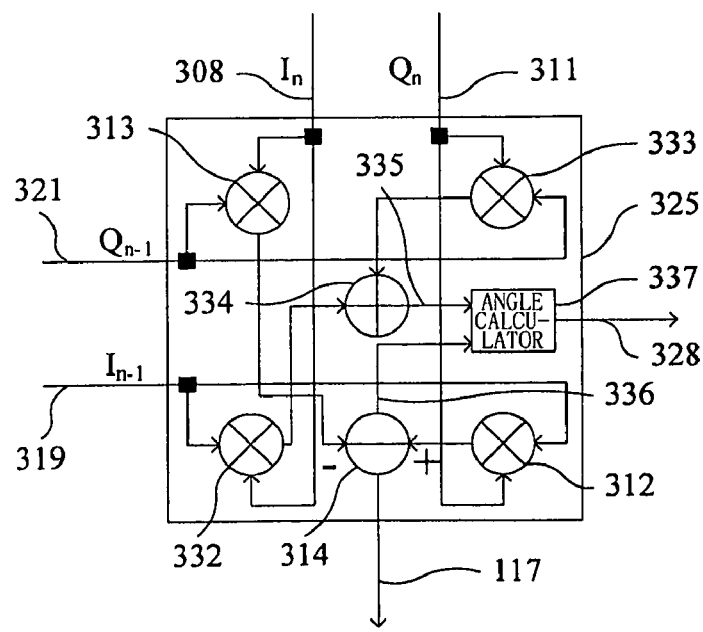
FIG. 7 shows the structure of an angle difference calculator used in the frequency offset monitor as shown in FIG. 6.

As shown in FIG. 7, the angle difference calculator comprises: a first multiplier 312, for calculating a product of a first input inputted via the first input terminal of the angle difference calculator and a fourth input inputted via the fourth input terminal of the angle difference calculator; a second multiplier 313, for calculating a product of a second input inputted via the second input terminal of the angle difference calculator and a third input inputted via the third input terminal of the angle difference calculator; a third multiplier 332, for calculating a product of the first input and the third input; a fourth multiplier 333, for calculating a product of the second input and the fourth input; an adder 324, for calculating a summation of the product of the first input and the third input with the product of the second input and the fourth input; a subtracter 314, for calculating a difference obtained by subtracting the product of the second input and the third input from the product of the first input and the fourth input; and an angle calculator 337, for calculating an angle difference based on the calculation results of the adder 334 and the subtracter 314.

The first input terminal of the first multiplier 312 is connected to the first input terminal of the angle difference calculator, the second input terminal of the first multiplier 312 is connected to the fourth input terminal of the angle difference calculator, the first input terminal of the second multiplier 313 is connected to the second input terminal of the angle difference calculator, the second input terminal of the second multiplier 313 is connected to the third input terminal of the angle difference calculator, the first input terminal of the third multiplier 332 is connected to the first input terminal of the angle difference calculator, the second input terminal of the third multiplier 332 is connected to the third input terminal of the angle difference calculator, the first input terminal of the fourth multiplier 333 is connected to the second input terminal of the angle difference calculator, the second input terminal of the fourth multiplier 333 is connected to the fourth input terminal of the angle difference calculator, the output terminal of the first multiplier 312 is connected to the positive input terminal of the subtracter 314, the output terminal of the second multiplier 313 is connected to the negative input terminal of the subtracter 314, the output terminal of the subtracter 314 is connected to the second input terminal of the angle calculator 337, the output terminal of the third multiplier 332 is connected to the first input terminal of the adder 334, the output terminal of the fourth multiplier 333 is connected to the second input terminal of the adder 334, and the output terminal of the adder 334 is connected to the first input terminal of the angle calculator 337.

As shown in FIG. 7, (308)+j(311) is:

$$s_{mN-1}\exp(j\Delta\omega mN\tau)\exp(-j\Delta\omega\tau) = s(t)\exp(j\Delta\omega t)|_{t=mN\tau-\tau}$$

(319)+j(321) is:

$$s_{mN-2}\exp(j\Delta\omega mN\tau)\exp(-j\Delta\omega 2\tau) = s(t)\exp(j\Delta\omega t)|_{t=mN\tau-2\tau}$$

Input (335)+j(336) of the angle calculator 337 is:

$$((308)*(319) + (311)*(321)) + j((311)*(319) - (308)*(321)) =$$
$$((308) + j(311)) * ((319) - j(321)) = s_{mN-1}\exp(j\Delta\omega mN\tau)$$
$$s^*_{mN-2}\exp(-j\Delta\omega mN\tau)\exp(j\Delta\omega t) = s_{mN-1}s^*_{mN-2}\exp(j\Delta\omega t)$$

Output 328 of the angle calculator 337 is:

$$\arg(s_{mN-1}s^*_{mN-2}\exp(j\Delta\omega\tau)).$$

For the second angle difference calculator 325, another output 117 of the subtracter 314 is:

$$Im(s_{mN-1}s^*_{mN-2}\exp(j\Delta\omega\tau)).$$

As previously mentioned, the output 117 selected from controlling the averager 110 by the threshold comparator 330 satisfies $\arg(s_{mN-1})=\arg(s_{mN-2})$, i.e., $s_{mN-1}s^*_{mN-2}$ is real number, so that the output 117 can be expressed as $s_{mN-1}s^*_{mN-2}\sin(\Delta\omega\tau)$. Thus, the output 118 of the frequency offset monitor 309" can still be expressed as:

$$\sin(\Delta\omega\tau)\langle s_{mN-1}s^*_{mN-2}\rangle.$$

In FIG. 7, the input of the angle calculator 337 is a complex number, its first input terminal is the real part of the complex number, while its second input terminal is the virtual part of the complex number, and the output of the angle calculator 337 is the angle of the complex number. The angle calculator 337 can be realized by publicly known technology.

Figure 8:
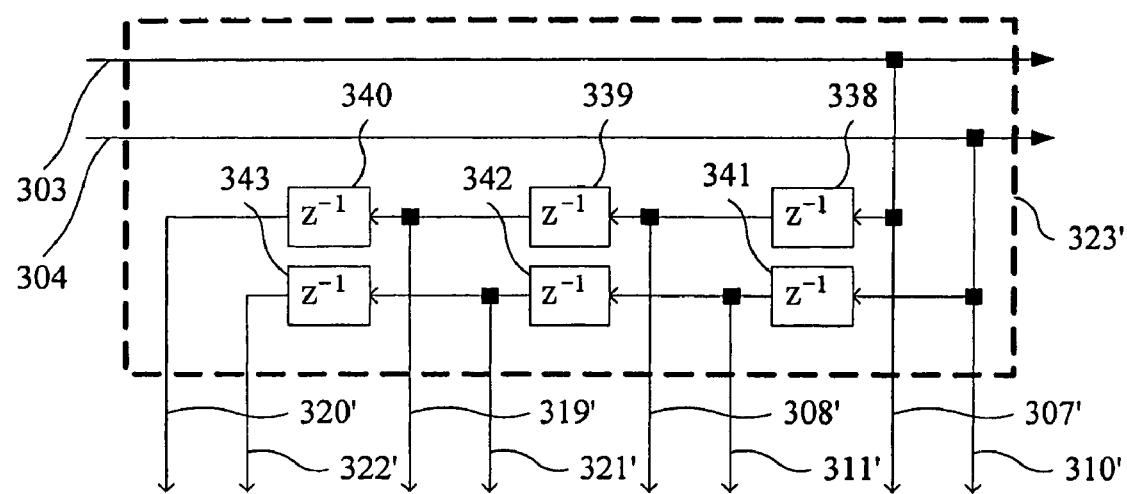
FIG. 8 shows a delay register structure obtaining four continuous sampled signals.

In the structure of the optical coherent receiver as shown in FIG. 6, the eight inputs of the frequency offset monitor 309" are obtained by the serial-to-parallel transforming mode of the monitored signal sampling section 323 as shown in FIG. 6, but the present invention is not restricted thereto, as it is also possible to obtain the eight inputs of the frequency offset monitor 309" by the delay mode as shown in FIG. 8, in which case the system operates in the serial mode.

FIG. 8 shows a delay register structure obtaining four continuous sampled signals.

As shown in FIG. 8, the monitored signal sampling section 323' comprises first to sixth delay registers 338-343, wherein the input terminal of the first delay register 338 is connected to the output terminal of the first analog-to-digital converter 301, and the input terminal of the first delay register 338 is further connected to the seventh input terminal of the frequency offset monitor 309", the output terminal of the first delay register 338 is connected to the input terminal of the second delay register 339, and the output terminal of the first delay register 338 is further connected to the fifth input terminal of the frequency offset monitor 309", the output terminal of the second delay register 339 is connected to the input terminal of the third delay register 340, and the output terminal of the second delay register 339 is further connected to the third input terminal of the frequency offset monitor 309", the output terminal of the third delay register 340 is connected to the first input terminal of the frequency offset monitor 309", the input terminal of the fourth delay register 341 is connected to the output terminal of the second analog-to-digital converter 302, and the input terminal of the fourth delay register 341 is further connected to the eighth input terminal of the frequency offset monitor 309", the output terminal of the fourth delay register 341 is connected to the input terminal of the fifth delay register 342, and the output terminal of the fourth delay register 341 is further connected to the sixth input terminal of the frequency offset monitor 309", the output terminal of the fifth delay register 342 is connected to the input terminal of the sixth delay register 343, and the output terminal of the fifth delay register 342 is further connected to the fourth input terminal of the frequency offset monitor 309", and the output terminal of the sixth delay register 343 is connected to the second input terminal of the frequency offset monitor 309".

In the foregoing FIGS. 1, 2, 4 and 6, the control logic 111 and the local oscillator 103 are publicly known devices in this field of technology. Usually, the local oscillator is a voltage controlled oscillator (VCO) whose frequency is controllable by means of a control voltage.

Although optical frequency control in the automatic frequency control according to the present invention is realized by VCO technology in the foregoing description, other modes of execution can also be employed to realize optical frequency control.

Figure 9:
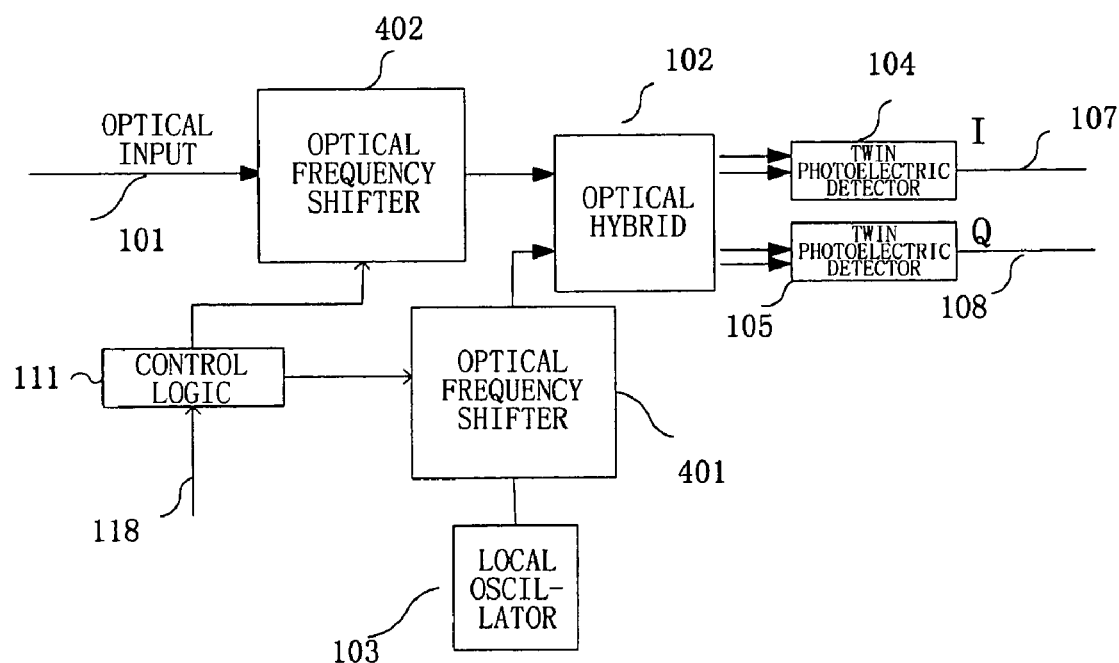
FIG. 9 shows optical frequency control according to the present invention with an optical frequency shifter rather than the common VCO technology.

FIG. 9 shows another solution for optical frequency control in the automatic frequency control of the optical coherent receiver according to the present invention. In the optical frequency control solution as shown in FIG. 9, optical frequency control is realized via an optical frequency shifter rather than the common VCO technology.

In the structure that achieves optical frequency control via the optical frequency shifter as shown in FIG. 9, a first optical frequency shifter 401 and/or a second optical frequency shifter 402 is/are respectively added between the local oscillator 103 and the optical hybrid 102 and/or between the optical input 101 and the optical hybrid 102.

The structure for optical frequency control as shown in FIG. 9 comprises: a local oscillator 103, for supplying a local oscillator optical signal; a first optical frequency shifter 401, for shifting a frequency of the local oscillator optical signal of the local oscillator 103; a second optical frequency shifter 402, for shifting a frequency of the optical input 101; an optical hybrid 102, for mixing the optical input with the local oscillator optical signal; a first twin photoelectric detector 104 and a second twin photoelectric detector 105, for converting the optical signal outputted from the optical hybrid into baseband electrical signals; and a control logic 111, for controlling operations of the first optical frequency shifter 401 and the second optical frequency shifter 402 in accordance with the frequency offset.

The output terminal of the local oscillator 103 is connected to the first input terminal of the first optical frequency shifter 401, the second input terminal of the first optical frequency shifter 401 is connected to the first output terminal of the control logic 111, the output terminal of the first optical frequency shifter 401 is connected to the second input terminal of the optical hybrid 102, the input terminal of the control logic 111 is connected to the output 118 of the frequency offset monitor, the second output terminal of the control logic 111 is connected to the second input terminal of the second optical frequency shifter 402, the first input terminal of the second optical frequency shifter 402 is connected to the optical input. 101, the output terminal of the second optical frequency shifter 402 is connected to the first input terminal of the optical hybrid 102, the first and second output terminals of the optical hybrid 102 are respectively connected to the first and second input terminals of the first twin photoelectric detector 104, and the third and fourth output terminals thereof are respectively connected to the first and second input terminals of the second twin photoelectric detector 105.

In the structure as shown in FIG. 9, the first optical frequency shifter 401 and the second optical frequency shifter 402 change optical frequencies without causing other influences, so that the optical frequencies are uniformly controlled. The first optical frequency shifter 401 and the second optical frequency shifter 402 can be realized by acousto-optic frequency shift (AOFS), just as described in "Integrated acousto-optic frequency shifter with surface acoustic wave", Zhang, Bin, Pan, Zhenwu, Mi, Bin, Tang, Quan'an, Proc. SPIE Vol. 3551, p. 107-111.

In the structure as shown in FIG. 9, the first optical frequency shifter 401 and the second optical frequency shifter 402 are used at the same time, but it is also possible to only use the first optical frequency shifter 401 or the second optical frequency shifter 402; in other words, the aforementioned effect can also be achieved by only using the first optical frequency shifter 401 or the second optical frequency shifter 402.

In the case the first optical frequency shifter 401 is used alone, the first input of the optical hybrid 102 is directly connected to the optical input 101, and the output terminal of the control logic 111 is connected only to the second input terminal of the first optical frequency shifter 401.

In the case the second optical frequency shifter 402 is used alone, the second input of the optical hybrid 102 is directly connected to the output terminal of the local oscillator 103, and the output terminal of the control logic 111 is connected only to the second input terminal of the second optical frequency shifter 402.

It should be easy for a person skilled in the art to conceive of various modifications and other embodiments of the present invention according to the foregoing detailed explanations on the principles of the present invention. Accordingly, the present invention is not restricted to the specific embodiments disclosed herein, but aims to cover all modifications and other embodiments that fall within the scopes of the appended claims.

The invention claimed is:

1. A low speed frequency offset monitoring device, comprising:
   a signal speed lowering section, for lowering the speed of an inputted signal and outputting the speed lowered signal; and
   a frequency offset monitor, for monitoring frequency offset of the speed lowered signal outputted by the signal speed lowering section,
   wherein the signal speed lowering section comprises:
   a first and a second serial-to-parallel converters, for converting serial signals to parallel signals to lower the speed of the signals;
   wherein an input terminal of the first serial-to-parallel converter is electrically coupled to the first input terminal of the low speed frequency offset monitoring device, an input terminal of the second serial-to-parallel converter is electrically coupled to the second input terminal of the low speed frequency offset monitoring device, and a plurality of parallel output ports of the first serial-to-parallel converter and the second serial-to-parallel converter are electrically coupled to the frequency offset monitor, wherein two continuous parallel output ports of each of the first serial-to-parallel converter and the second serial-to-parallel converter are electrically coupled to the frequency offset monitor, and wherein a first parallel output port of the two continuous parallel output ports of the first serial-to-parallel converter is electrically coupled to the fourth input terminal of the frequency offset monitor, a second parallel output port of the two continuous parallel output ports of the first serial-to-parallel converter is electrically coupled to the first input terminal of the frequency offset monitor, a first parallel output port of the two continuous parallel output ports of the second serial-to-parallel converter is electrically coupled to the second input terminal of the frequency offset monitor, a second parallel output port of the two continuous parallel output ports of the second serial-to-parallel converter is electrically coupled to the third input terminal of the frequency offset monitor, and the output terminal of the frequency offset monitor is electrically coupled to the output terminal of the low speed frequency offset monitoring device, and wherein the frequency offset monitor comprises:

a first multiplier, for calculating a product of signals inputted via the first input terminal and the second input terminal of the frequency offset monitor, and outputting the calculation result;

a second multiplier, for calculating a product of signals inputted via the third input terminal and the fourth input terminal of the frequency offset monitor, and outputting the calculation result;

a subtracter, for calculating a difference obtained by subtracting the calculation result of the second multiplier from the calculation result of the first multiplier, and outputting the difference; and an averager, for calculating an average value of the difference outputted by the subtracter as the result of frequency offset monitoring;

wherein a first input terminal of the first multiplier is electrically coupled to the first input terminal of the frequency offset monitor, a second input terminal of the first multiplier is electrically coupled to the second input terminal of the frequency offset monitor, an output terminal of the first multiplier is connected to a positive input terminal of the subtracter, a first input terminal of the second multiplier is electrically coupled to the third input terminal of the frequency offset monitor, a second input terminal of the second multiplier is electrically coupled to the fourth input terminal of the frequency offset monitor, an output terminal of the second multiplier is electrically coupled to a negative input terminal of the subtracter, an output terminal of the subtracter is connected to an input terminal of the averager, and an output terminal of the averager is electrically coupled to the output terminal of the frequency offset monitor.

2. An optical coherent receiver, comprising:

the low speed frequency offset monitoring device according to claim 1, for monitoring a frequency offset of an inputted optical signal;

a control logic, for outputting a control signal in accordance with the frequency offset to control the frequency offset;

a local oscillator, for supplying a local oscillator optical signal in accordance with the control signal from the control logic;

an optical hybrid, for mixing an inputted optical signal with the local oscillator optical signal;

first and second twin photoelectric detectors, for converting the optical signal outputted from the optical hybrid into electrical base band signals; and a digital signal processor, for processing the converted signal to obtain a data output;

wherein the low speed frequency offset monitoring device monitors the frequency offset of the inputted optical signal in accordance with the converted signal.

3. The optical coherent receiver according to claim 2, further comprising:

first and second A/D converters, for respectively converting the base band electrical signals outputted from the first and the second twin photoelectric detectors into digital signals;

wherein the first and second A/D converters are respectively electrically coupled between the first and second twin photoelectric detectors and the low speed frequency offset monitoring device.

* * * * *